United States Patent
Segev et al.

(10) Patent No.: US 9,703,716 B2
(45) Date of Patent: Jul. 11, 2017

(54) PARTIAL MEMORY COMMAND FETCHING

(71) Applicant: SanDisk Technologies LLC, Plano, TX (US)

(72) Inventors: Amir Segev, Meitar (IL); Shay Benisty, Beer Sheva (IL)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/841,094

(22) Filed: Aug. 31, 2015

(65) Prior Publication Data

US 2017/0060749 A1    Mar. 2, 2017

(51) Int. Cl.
  *G06F 12/08* (2016.01)
  *G06F 12/0862* (2016.01)
  *G06F 3/06* (2006.01)

(52) U.S. Cl.
  CPC ........ *G06F 12/0862* (2013.01); *G06F 3/0613* (2013.01); *G06F 3/0656* (2013.01); *G06F 3/0659* (2013.01); *G06F 3/0688* (2013.01); *G06F 2212/602* (2013.01)

(58) Field of Classification Search
  CPC .................................. G06F 12/08; G06F 3/06
  See application file for complete search history.

(56) References Cited

U.S. PATENT DOCUMENTS

2011/0145474 A1*  6/2011  Intrater ................. G06F 13/385
                                                        711/103

* cited by examiner

*Primary Examiner* — David X Yi
*Assistant Examiner* — Zubair Ahmed
(74) *Attorney, Agent, or Firm* — Stoel Rives LLP

(57) ABSTRACT

A system and method that allows idle process logic blocks in a memory device to be utilized when the idle process logic blocks would otherwise be remaining idle as the current memory commands are executed. Utilizing the otherwise idle process logic blocks in the memory device allows more optimized use of the process logic blocks while not slowing or otherwise interfering with the execution of the current memory commands. The otherwise idle process logic blocks can perform additional operations for subsequently fetched memory commands that may otherwise cause delays in execution of the subsequently fetched memory commands.

20 Claims, 5 Drawing Sheets

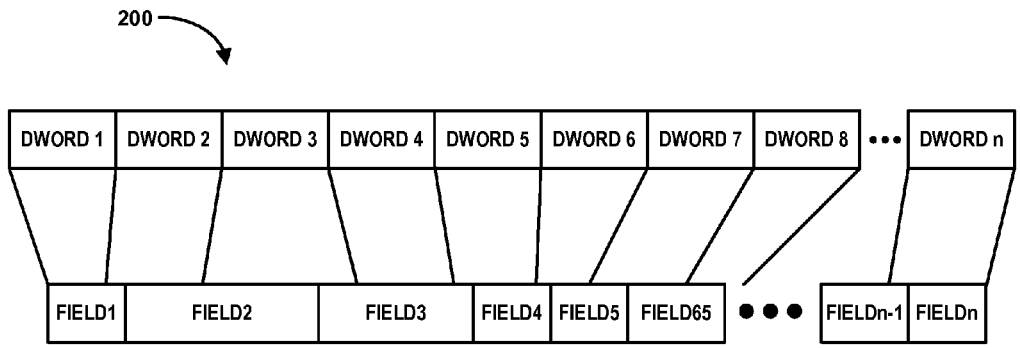

FIG. 2

| BIT | DESCRIPTION |
|---|---|
| 63:00 | STARTING LBA (SLBA): This field indicates the 64-bit address of the first logical block to be read as part of the opertion. Command Dword 10 contains bits 31:00; Command Dword 11 contains bits 63:32 |
| BIT | DESCRIPTION |
| 31 | LIMITED RETRY (LR): If set to '1', the controller should apply limited retry efforts. If cleared to '0', the controller should applu all available error recovery means to return the data to the host. |
| 30 | FORCE UNIT ACCESS (FUA): This field indicates that the data read shall be returned from non-volatilie media. There is no implied ordering with other commands |
| 29:26 | PROTECTION INFORMATION FIELD (PRINFO): Specifies the protection information action and check field, as defined in Figure 156 |
| 25:16 | RESERVED |
| 15:00 | NUMBER OF LOGICAL BLOCKS (NLB): This field indicates the number of logical blocks to be read. This is a 0's based value. |

FIG. 3

PARTIAL MEMORY COMMAND FETCHING

FIELD OF THE INVENTION

The present invention relates generally to memory systems, and more particularly, to methods and systems for fetching memory commands from a host computer systems.

BACKGROUND

Non-volatile memory systems include a non-volatile memory controller and the non-volatile memory storage media. A host computer system issues and places one or more non-volatile memory commands in memory command queues. The memory command queues are allocated portions of the host computer system's memory. The host computer notifies a non-volatile memory controller that the non-volatile memory commands are available to be fetched in the memory command queues.

The non-volatile memory controller fetches the commands in an order defined by a non-volatile memory protocol. The non-volatile memory controller fetches the new memory command from the memory command queues and starts to perform a flow of operations for servicing the fetched memory command. Each operation involving different processes of firmware code (CPU) and/or hardware modules. Examples for such processes include, but not limited to: preparing memory buffers, memory address mapping scheme for translating LBA address to physical memory block address, decoding schemes for decoding data, arbitration logic for fetching data from the non-volatile memory storage and sending a completion indication back to the host computer system and others.

The non-volatile memory controller requires all the information needed to perform each memory command and the command must be fully fetched. Unfortunately, the memory command fetching encumbers the end protocol of the host computer system, such as PCIe, and can significantly slow the throughput of data to and from the non-volatile memory system.

SUMMARY

Broadly speaking, the present invention can increase the throughput of data into and out of the non-volatile memory system. It should be appreciated that the present invention can be implemented in numerous ways, including as a process, an apparatus, a system, computer readable media, or a device. Several inventive embodiments of the present invention are described below.

One implementation allows idle process logic blocks in the memory device to be utilized when they would otherwise be remaining idle as the current memory commands are executed. Utilizing the otherwise idle process logic blocks in the memory device allows more optimizing use of the process logic blocks while not slowing or otherwise interfering with the execution of the current memory commands. The otherwise idle process logic blocks can perform additional operations for subsequently fetched memory commands that may otherwise cause delays in execution of the subsequently fetched memory commands.

Another implementation provides for a system and a method for fetching only portions of one or more memory commands from a host computer rather than requiring fetching the entire memory commands. Fetching only portions of the memory commands provides opportunity to perform those portions of those commands in advance of fetching the entire command.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIG. 2 is a memory command, for implementing embodiments of the present disclosure.

FIG. 3 is a table of example fields from a memory command, for implementing embodiments of the present disclosure.

DETAILED DESCRIPTION

Several exemplary embodiments for increasing the throughput of data into and out of non-volatile memory systems will now be described. It will be apparent to those skilled in the art that the present invention may be practiced without some or all of the specific details set forth herein.

In one embodiment, only selected portions or fields of a non-volatile memory command are fetched from the memory command queues rather than requiring fetching the complete non-volatile memory command. The fetched portion is just enough to assist one or more different processes required of the non-volatile memory system controller such as may be required for serving the fetched commands, making better decisions, or making sure the hardware modules executing these processes are fully utilized as much as possible while minimizing idle, unused time.

The fetched, selected portions of the non-volatile memory command can be used for activating an idle hardware and/or firmware module for running these processes in advance. The resulting improved utilization on the end protocol (such as PCIe) by postponing the fetching of the reminder of the command to a time when the bus (PCIe) is otherwise idle. Fetching only the selected portions of the non-volatile memory command will also improve the time needed to complete execution of each non-volatile memory command.

Some examples for hardware modules that execute such non-volatile memory processes may include central processing unit (CPU), hardware accelerators, logical block address (LBA) to physical block address (BPA) translation logic, buffer management, among other hardware modules. In another example, if two non-volatile memory commands require continuous data, then performing some of these processes (e.g. buffer management, address translation, data reads, etc.) ahead of time can save time when accessing the non-volatile storage media such as flash memory or other types of non-volatile memory cell storage media.

In one embodiment, identifying an idle processes and/or idle hardware module in the non-volatile memory system that is involved in the servicing of already fetched non-volatile memory commands. The hardware logic can include an interrupt function to raise and interrupt when in idle state occurs and indicate the idle state to the non-volatile memory controller. The non-volatile memory controller can then fetch portions of non-volatile memory commands that are required to put the idle process or idle module into operation. A state machine, CPU code or another system or method could be for determining which portions of the non-volatile memory command are required by the idle processes or idle modules. This allows activating the idle processes and modules in advance with the selected prefetched portions of the commands, thereby reducing the processing load and reducing latency times when servicing the non-volatile memory storage media with the remainder of the non-volatile memory command.

Figure 1:
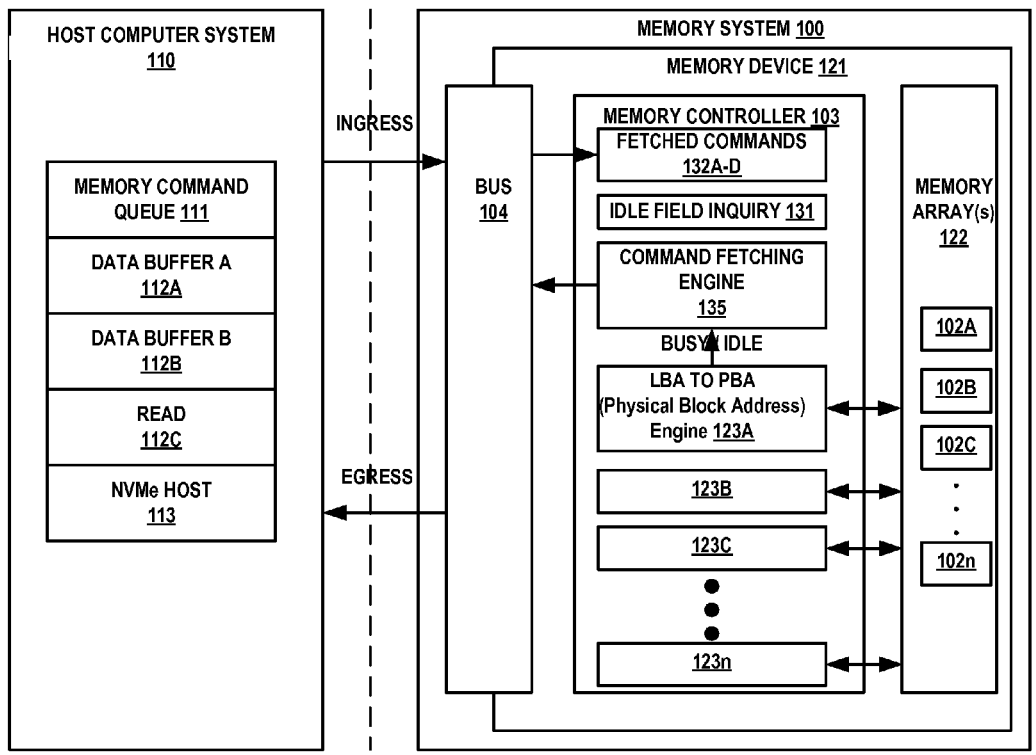
FIG. 1 is a block diagram of a memory system, for implementing embodiments of the present disclosure

FIG. 1 is a block diagram of a memory system 100, for implementing embodiments of the present disclosure. The memory system 100 is coupled to or included as part of a host computer system 110. The memory system 100 includes one or more memory devices 121. The memory device 121 includes a memory array 122. The memory array 122 includes many memory cells arranged in logical blocks 102A-n of memory cells (e.g., memory blocks 102A-n). The memory device 121 can also include a bus 104, such as a PCIe bus, for communicating with the host computer system 110.

The memory device 121 also includes a command fetching engine 135, multiple fetched command queues 132A-D and a physical block address engine 123A for calculating LBA to PBA conversions. The physical block address engine 123A is merely an example logical process block that can benefit from the improved performance described herein and the memory device 121 can also include additional process logic blocks 123B, 123C-123n. Each of the logical process blocks 123A-n can be implemented in hardware, firmware, software and combinations of two or more of hardware, firmware and software.

The process logic blocks 123A-n can include hardware, firmware and software implemented logic and devices for performing the internal operations of the memory device 121. Some examples of internal operations performed by the process logic blocks 123A-n include controlling the memory device 121 such as a memory control unit, a processor, an application specific integrated circuit (ASIC), random access memory buffers, buffer allocation, prefetching data (such as from the memory array 122 for read commands), reading and preparing PRP lists (such as from host computer system or local buffers), fetching name space information, and memory controller logic. Optionally, one or more of the process logic blocks 123A-n can be part of a memory controller 103. The memory controller 103 can be coupled to one or more memory arrays 122.

In one implementation, the logical process block 123B includes a processor and process logic block 123C includes the memory controller logic. The memory controller logic 123C can include interfacing protocols between the memory controller 103 and the memory blocks 102A-n and between the memory system 100 and the host computer system 110. The memory controller logic 123C can include software, hardware and firmware that is executable by the processor 123B.

The memory blocks 102A-n can include non-volatile memory (NVM) such as flash memory (e.g., NAND flash) and other types of memory such as NOR, ORNAND, 3D memory and charge trapping memory with material such as silicon nitride, and phase change memory such as ReRAM, and semi-volatile memory such as DRAM and SRAM. The memory blocks 102A-n can also include volatile type memory circuits. The volatile type memory circuits can include, as an example, dynamic random access memory (DRAM) and static random access (SRAM) memory circuits.

Referring again to FIG. 1, the host computer system 110 can include memory command submission queue 111 for storing the memory commands issued by the host computer system 110. The host computer system 110 can also include data buffer A 112A and data buffer B 112B for storing data to be transferred to and from the memory system 100. There can be many configurations and uses of the data buffer A 112A and data buffer B 112B. By way of example, the data buffer A 112A and data buffer B 112B can physically be a single buffer or physically two or more buffers. In another configuration, the data buffer A 112A and data buffer B 112B can be more than one physical buffer that is utilized logically as a single data buffer that can be flexible in size to accommodate a the data needed to be transferred between the host computer system 110 and the memory system 100 and from the memory system to the host computer system. The host computer system 110 can also include a read module 112C and a non-volatile memory host module 113. It should be understood that the host computer system 110 can include additional data buffers in addition to the data buffer A 112A and data buffer B 112B.

FIG. 2 is a memory command 200, for implementing embodiments of the present disclosure. The memory command 200 can have a length of as much as 64 bytes or even more. The memory command 200 includes multiple Dwords1-n. Each of the Dwords1-n can have a respective length of 4 bytes. Each of the Dwords1-n have one or more fields or portions of fields as shown. Each of the fields from Field1 to Fieldn have their respective lengths ranging from as little as one bit too as much as several bytes. For example, Field1 could be a single bit flag and Field2 can be an address spanning two or more Dwords and Field3 can be a data field spanning two or more Dwords or even more. It should be noted that the fields Field1-n are not drawn to scale relative to the Dwords1-n.

The memory command 200 can be used for several different functions including, for examples: data address translation, categorizing commands such as write, read, short read, long read commands. Other example memory commands include being part of a stream of commands. The memory command 200 can also include error detection, encryption and decryption commends. The memory command 200 can also allocate buffers. Memory command 200 can also perform administrative functions such as adjusting power level, fetching scattered data tables and determining memory attributes. It should be noted that the foregoing are merely non-exclusive lit of example memory commands.

FIG. 3 is a table 300 of example fields from a memory command, for implementing embodiments of the present disclosure. The table 300 lists the bit location and a description of each of the fields within the memory command 200. The description can also include a length of each of the fields within the memory command 200. These are example fields and many different types of information and format of the fields can be included in the memory command 200.

FIGS. 2 and 3 depict an example usage of pre-fetching of selected portions, such as one or more fields, of the non-volatile memory command for activating the address translation logic in ahead of time to thereby obtain the actual physical block address on the non-volatile memory that is used by the reminder of the memory command. It should be understood that this is only an example and that the disclosed embodiments are not limited to the address translation and any other processes and operations can also be improved to substantially eliminate idle processes and modules as described in the disclosed embodiments.

In the address translation example it is presumed that the address translation logic in the non-volatile memory controller determines the actual physical block addresses (PBA) based on the selected logical block address (SLBA) and number of logical blocks (NLB) fields of the non-volatile memory command issued by the host computer system. The SLBA and NLB portions of the non-volatile memory command, when taken together, indicate to the address translation logic which logical block addresses (LBAs) are required for the read operation. This calculation can require a significant amount of time as the calculation can require accessing the non-volatile memory storage media such as for reading tables stored in the non-volatile memory system and other operations such as reading, analyzing and saving the analysis results of PRP/SGL tables and many other non-volatile memory operations. PRP/SGL tables are two formats (PRP and SGL) of lists pointing to chunks of data. Before a memory device can actually read the data, the memory device must need to read where the data resides. The memory command may not have enough space to cover the actual location of the data. The buffer with (for writes) or for (reads) the data can be scattered (SGL=scatter-gather-list) in many locations in the host memory.

Figure 4:
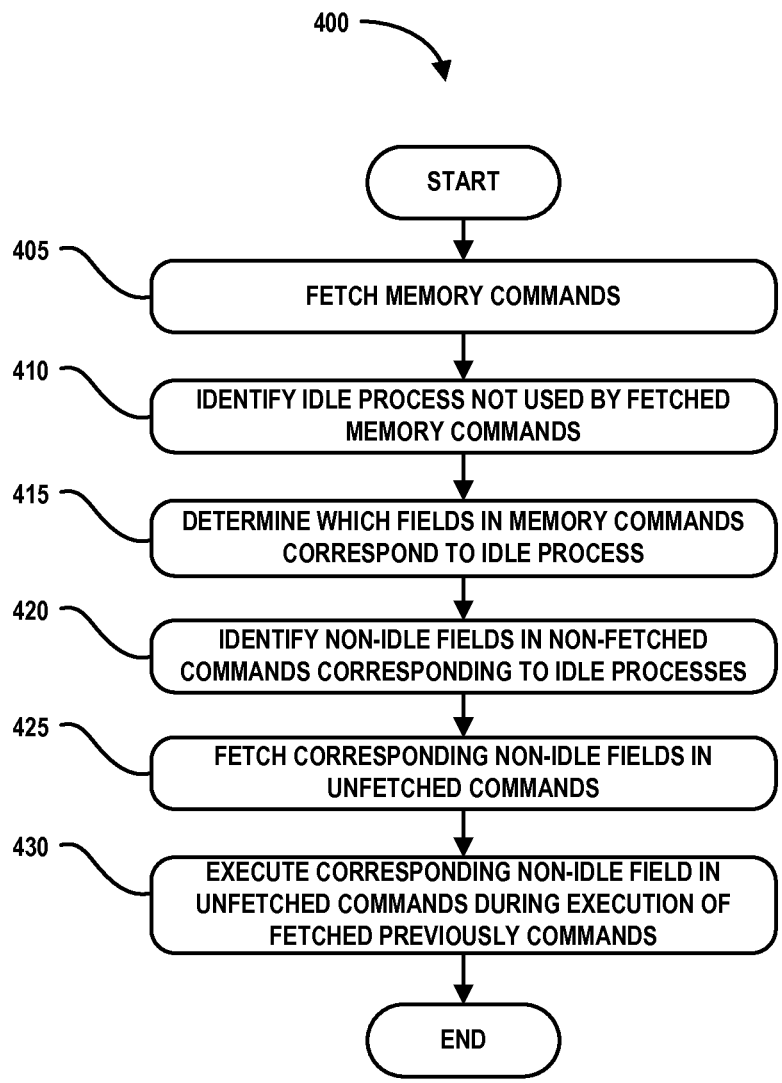
FIG. 4 is a flowchart diagram that illustrates the method operations performed in using idle processes during execution of other memory commands, for implementing embodiments of the present disclosure.

FIG. 4 is a flowchart diagram that illustrates the method operations 400 performed in using idle processes during execution of other memory commands, for implementing embodiments of the present disclosure. The operations illustrated herein are by way of example, as it should be understood that some operations may have sub-operations and in other instances, certain operations described herein may not be included in the illustrated operations. With this in mind, the method and operations 400 will now be described.

In an operation 405, the memory device 121 fetches memory commands from the host computer system 110. In an operation 410, the memory device 121 identifies idle processes that are not used by the fetched memory commands. The idle processes correspond to the process logic blocks 123A-n.

In an operation 415, the memory device 121 determines the fields that correspond to the idle processes identified in operation 410. In an operation 420, the memory device 121 examines the non-fetched memory commands remaining in the memory command queue 111 to identify non-idle fields in the non-fetched commands.

In an operation 425, the memory device 121 fetches the identified corresponding non-idle fields in the non-fetch memory commands. In an operation 430, the fetched non-idle fields from the non-fetched memory commands are executed in the memory device during the execution of the fetched memory commands that were fetched in operation 405 above. Executing additional operations represented by the non-idle fields to cause idle process logic blocks 123A-n to be utilized during the execution of the fetched memory commands does not delay or otherwise slow the execution of the fetched memory commands. Executing additional operations represented by the non-idle fields to cause idle process logic blocks 123A-n to be utilized during the execution of the fetched memory commands can also accelerate execution of later fetched memory commands.

Figure 5:
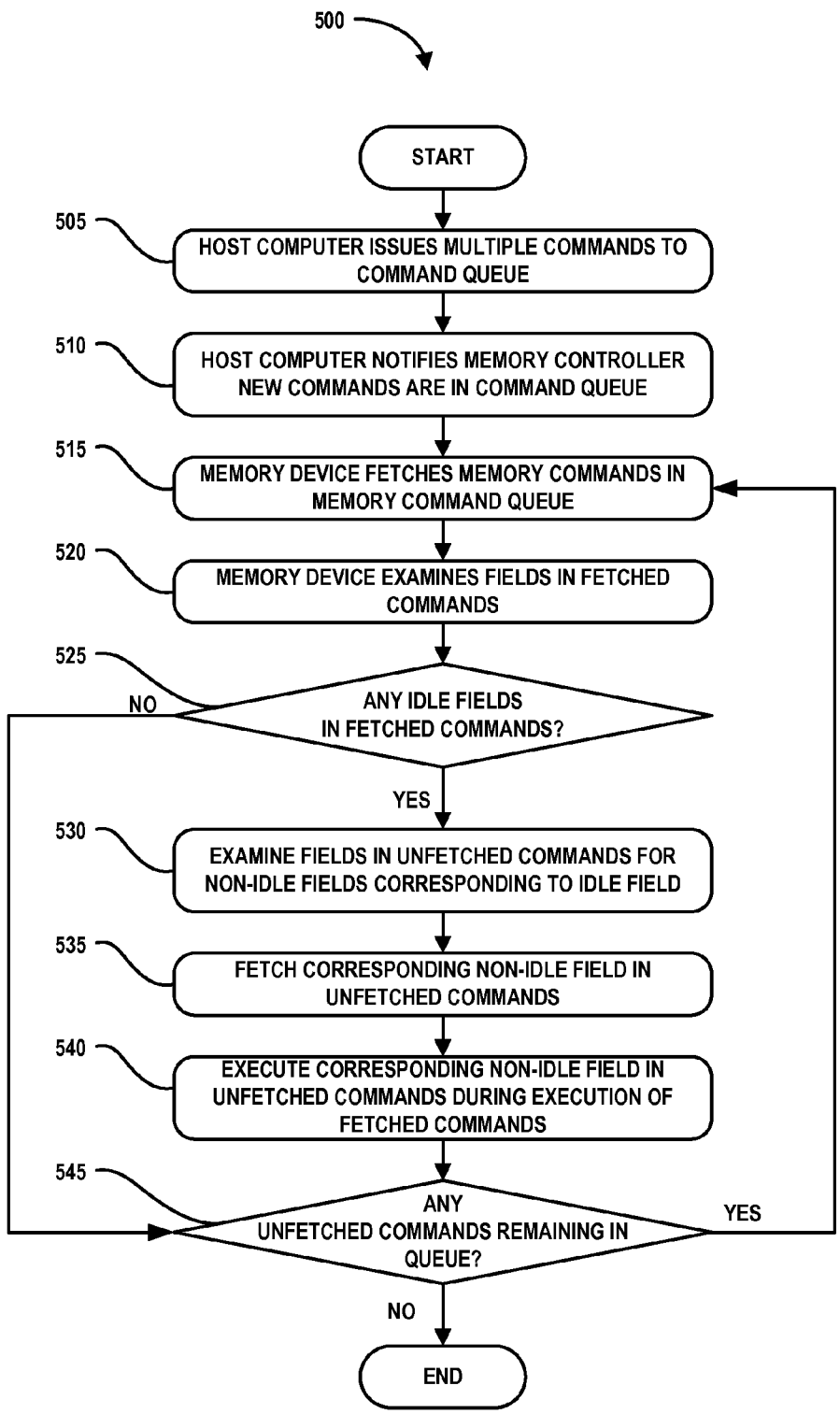
FIG. 5 is a flowchart diagram that illustrates the method operations performed in fetching commands from the memory command queue in the host computer system, for implementing embodiments of the present disclosure.

FIG. 5 is a flowchart diagram that illustrates the method operations 500 performed in fetching commands from the memory command queue 111 in the host computer system 110, for implementing embodiments of the present disclosure. The operations illustrated herein are by way of example, as it should be understood that some operations may have sub-operations and in other instances, certain operations described herein may not be included in the illustrated operations. With this in mind, the method and operations 500 will now be described.

In an operation 505, the host computer issues multiple memory commands to the memory command queue 111 in the host computer system 110. The issued memory commands can include as many as 16 or more commands in the memory command queue 111. The memory commands issued to the memory command queue 111 by the host computer system can be prioritized in the order issued to the memory command queue such as first in first out or last in first out or any other suitable prioritization scheme. In one implementation the memory command queue 111 is cyclical such as a first in first out buffer. In one implementation a previously written memory command will reside in the memory command queue 111 until a new memory command issued to the memory command queue 111 overwrites the previously written memory command. The memory commands in the memory command queue 111 can be accessed in order or in alternative implementations, can be accessed randomly or in any suitable order as may be selected.

In an operation 510, the host computer notifies the memory device 121 that one or more new memory commands are available in the memory command queue 111. Notifying the memory device 121 can include setting a flag in a state machine or issuing an interrupt signal to the memory device. Any other suitable notification method could also be used. In one implementation, the host computer system 110 operation of placing a memory command in the memory command queue 111, can automatically issue a notification to the memory device 121 that one or more new memory commands are available in the memory command queue 111.

In an operation 515, the command fetching engine 135 in the memory device 121 fetches one or more memory commands from the memory command queue 111 and places the fetched memory commands in the fetched commands buffers 132A-D. In one implementation, fetching the memory command can also include deleting the fetched memory command from the memory command queue 111.

The memory device 121 may not have the capacity of fetching all of the memory commands from the memory command queue 111 and only a few of the memory commands may be fetched. In one implementation the memory command queue 111 has the capacity of 16 or more memory commands and the fetched commands buffers 132A-D in the memory device 121 has the capacity of holding 4 memory commands. In such an implementation, the memory device 121 will fetch only 4 memory commands from the memory command queue 111. As will be described in more detail below fetching the one or more memory commands from the memory command queue 111 can also include fetching only a selected portion of a memory command in the memory command queue. In some instances, fetching the one or more memory commands from the memory command queue 111 can include fetching multiple selected portions of one or more memory commands in the memory command queue.

In an operation 520, the memory device 121 examines the fields in each of the fetched memory commands to identify if any of the fields resulted in an idle status of a logical process block 123A-n within the memory device, in an operation 525. By way of example, if a first fetched memory command includes a field that is idle, then the remaining fetched memory commands must be examined to determine if that same field is also idle in each of the fetched memory commands.

As described above, each of the memory commands includes multiple Fields1-n. Each of the fields has a logical function corresponding to a logical process block 123A-n within the memory device 121. If the same field in each of the fetched memory commands is idle then the corresponding logical process block 123A-n is also idle and not being used during the execution of all of the fetched memory commands.

By way of example, a first fetched memory command can include a Field2 that includes a read command and a Field3 that identifies a logical memory address for the data to be read from the memory device 121 however, Field2 and Field 3 are blank in the first fetched memory command. To read the correct data, logical address included in the field3 is first translated from the logical address to a physical block address in the memory array 122, before the read command in the field2 can be executed. The logical address to a physical block address translation is calculated by the LBA to PBA engine 123A. As a result of Field2 and Field3 being blank in the first fetched memory command, the LBA to PBA engine 123A is idle as far as the first fetched memory command is concerned.

The memory device 121 then examines each of the remaining fetched memory commands to determine if the Field2 and Field3 are blank in the remaining fetched memory commands such that the LBA to PBA engine 123A is also idle in each of the remaining fetched memory commands. If the remaining fetched memory commands also do have the LBA to PBA engine 123A idle, then the LBA to PBA engine 123A identified as an idle process logic block in the memory device 121 and the method operations continue in an operation 530, as described below.

If one of the remaining fetched memory commands does not have the LBA to PBA engine 123A idle, then the LBA to PBA engine 123A not identified as an idle process logic block in the memory device 121. If no other idle process logic blocks are identified, then the method operations continue in an operation 545, as described below.

In operation 530, the memory device 121 examines the previously not fetched memory commands in the memory command queue 111 for any fields that correspond to the idle process logic blocks identified in operation 525 above, for non-idle corresponding Fields1-n present in the issued, previously not fetched memory commands in the memory command queue.

Continuing with the above example: Field2 and Field3 are identified as causing the LBA to PBA engine 123A to be unused or idle during processing of the 4 fetched memory commands. Thus, the memory device 121 examines the previously not fetched memory commands in the memory command queue 111 for any Field2 and Field3 that can use the presently idle LBA to PBA engine 123A.

In one implementation, examining the previously not fetched memory commands in the memory command queue 111 includes the command fetching engine 135 fetching a next previously not fetched memory command from the memory command queue 111 and placing the newly fetched memory command in an optional idle field inquiry buffer 131 in the memory device and examining the fields in the newly fetched memory command similar to as described in operations 515 and 520 above. If none of the fields in the newly fetched memory command in the idle field inquiry buffer have any fields that correspond to the idle process logic blocks identified in operation 525 above, a next previously not fetched memory command in the memory command queue 111 is fetched and placed in the idle field inquiry buffer and the fields are examined as described above.

In another implementation, the command fetching engine 135 searches the previously not fetched issued memory commands residing in the memory command queue 111 for fields that correspond to the idle process logic blocks identified in operation 525 above.

In an operation 535, a non-idle field is fetched from a memory command residing in the memory command queue 111. The fetched non-idle fields are placed in the fetched commands buffers 132A-D including a pointer to the command the fetched non-idle field originated from in the memory command queue 111. In an operation 540, the fetched, non-idle field is executed during the execution of the first 4 fetched memory commands.

Continuing the above example, the fetched, non-idle field is fetched from the sixth memory command in the memory command queue 111. As a result, the fetched, non-idle field and a pointer are stored in the fetched commands buffers 132A-D. The fetched, non-idle field is executed to place the LBA to PBA engine 123A in operation performing an address translation needed by the sixth memory command in the memory command queue 111. The address translation needed by the sixth memory command in the memory command queue 111 occurs while the 4 originally fetched memory commands are being executed by the memory device 121.

In operation 545, memory command queue 111 is examined to determine if any remaining unfetched commands remain in the memory command queue. If unfetched commands remain in the memory command queue 111, and the method operations continue in operation 515 as described above. Alternatively, if no unfetched commands remain in the memory command queue 111, and the method operations can end.

Continuing the above example, the a fifth and a sixth memory commands remain in the memory command queue 111 and the fifth and a sixth memory commands are fetched in operation 515. The address translation needed by the sixth memory command is already available before the sixth memory command is executed by the memory device 121 and thus the sixth memory command does not need to wait for the address translation and can be executed immediately.

The address translation needed by the sixth memory command is performed by an unused process logic block, specifically the LBA to PBA engine 123A, while the first four memory commands were being executed. Thus the processing of the address translation needed by the sixth memory command does not interfere with or otherwise slow the execution of the first four memory commands. Further, the advance processing of the address translation needed by the sixth memory command reduces delays of executing the sixth memory command.

Figure 6:
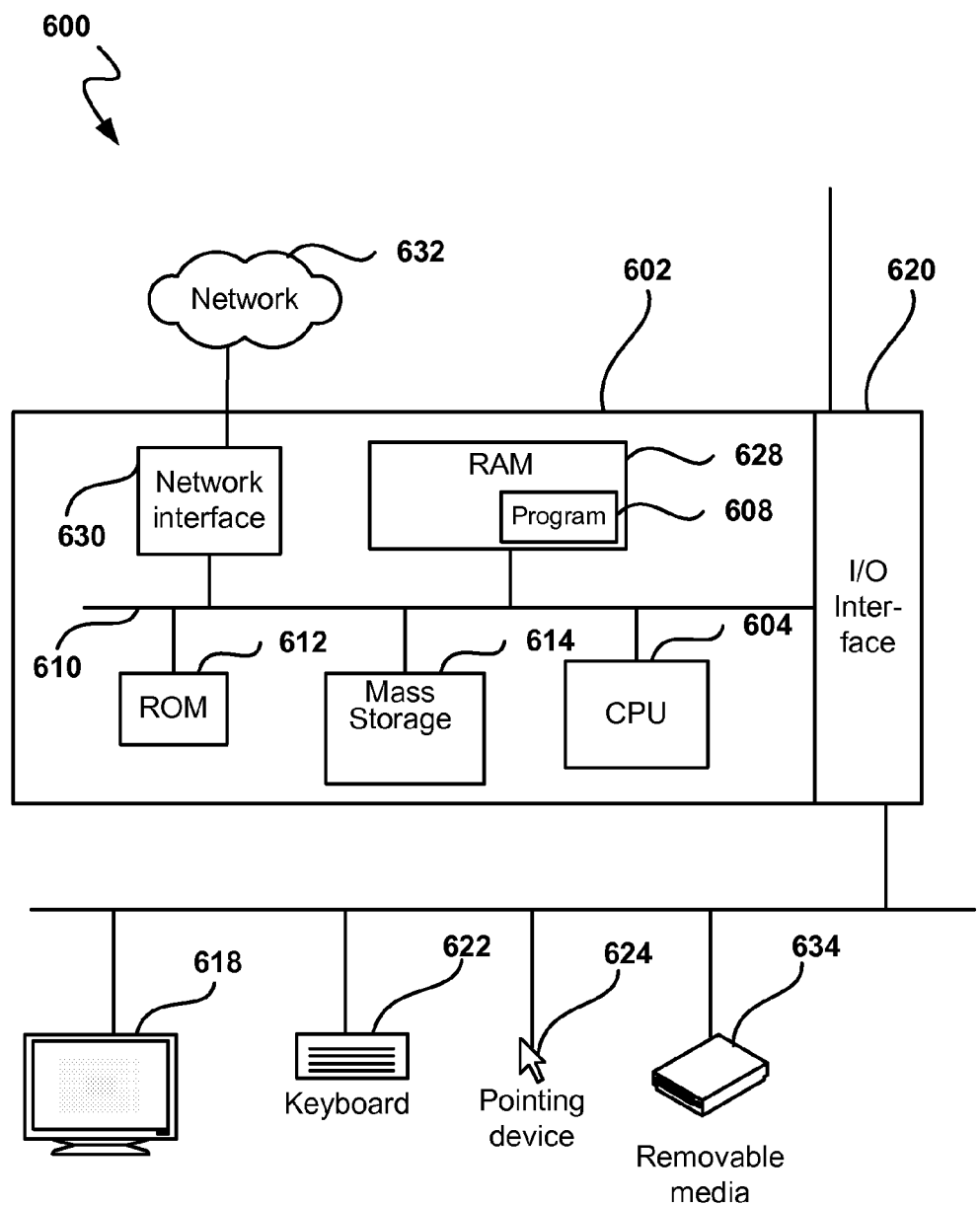
FIG. 6 is a block diagram of an example computer system, for implementing embodiments of the present disclosure.

FIG. 6 is a block diagram of an example computer system 600, for implementing embodiments of the present disclosure. A general or specialized computer system, such as the computer system 600 and used for executing the operations for performing at least a portion of the processes described above such as the host computer system 110. The computer system 600 includes a computer 602, a display 618, an optional printer or output device (not shown), a removable media (e.g., magnetic/optical/flash) drive 634, a mass storage system 614 (e.g., hard disk drive, solid state drive, or other suitable data storage device), a network interface 630, and a keyboard 622. Additional user interface devices such as a mouse 624, a touch pad or touch screen can also be included. One or more of the memory systems 100 can be included in one or both of the removable media (e.g., magnetic/optical/flash) drive 634 and/or the mass storage system 614 (e.g., hard disk drive, solid state drive, or other suitable data storage device).

The computer 602 includes a central processing unit 604, one or more data buses 610, random access memory (RAM) 628, read only memory (ROM) 612, and an input/output interface 620. The computer 602 can be a personal computer (such as an IBM compatible personal computer, a Macintosh computer or Macintosh compatible computer), a workstation computer (such as a Sun Microsystems or Hewlett-Packard workstation), or some other suitable type of computer.

The CPU 604 can be a general purpose digital processor or a specially designed processor. The CPU 604 controls the operation of the computer system 600. Using instructions retrieved from memory (e.g. program(s) 608), the CPU 604 controls the reception and manipulation of input data and the output and display of data on output devices.

The data buses 610 are used by the CPU 604 to access the RAM 628, the ROM 612 and the mass storage 614. The RAM 628 is used by the CPU 604 as a general storage area and as scratch-pad memory, and can also be used to store input data and processed data. The RAM 628 and the ROM 612 can be used to store computer readable instructions or program code 608 readable and executable by the CPU 604 as well as other data.

The bus 610 can also be used to access the input, output, and storage devices used by the computer 602. These devices include the display 618, the optional printer (not shown), the removable media drive 634, and the network interface 630. The input/output interface 620 is used to receive input from keyboard 622 and send decoded symbols for each pressed key to CPU 604 over the data bus 610.

The display 618 is an output device that displays images of data provided by the CPU 604 via the bus 610 or provided by other components in the computer system 600. The optional printer device, when operating as a printer, provides an image on a sheet of paper or a similar surface. Other output devices such as a plotter, projector, etc. can be used in place of, or in addition to, the printer device.

The removable media drive 634 and the mass storage 614 can be used to store various types of data. The removable media drive 634 facilitates transporting such data to other computer systems, and mass storage 614 permits fast access to large amounts of stored data. The mass storage 614 may be included within the computer system or may be external to the computer system such as network attached storage or cloud storage accessible over one or more networks (e.g., local area networks, wide area networks, wireless networks, Internet 632) or combinations of such storage devices and locations.

The CPU 604 together with an operating system operate to execute computer readable code and logic and produce and use data. The computer code, logic and data may reside within the RAM 628, the ROM 612, or the mass storage 614 or other media storage devices and combinations thereof. The computer code and data could also reside on a removable program medium and loaded or installed onto the computer system 600 when needed. Removable program media include, for example, DVD, CD-ROM, PC-CARD, floppy disk, flash memory, optical media and magnetic disk or tape.

The network interface 630 is used to send and receive data over a network 632 connected to other computer systems. An interface card or similar device and appropriate software implemented by the CPU 604 can be used to connect the computer system 600 to an existing network and transfer data according to standard protocols such as local area networks, wide area networks, wireless networks, Internet and any other suitable networks and network protocols.

The keyboard 622 is used by a user to input commands and other instructions to the computer system 600. Other types of user input devices can also be used in conjunction with the present invention. For example, pointing devices such as a computer mouse, a track ball, a stylus, touch pad, touch screen or a tablet can be used to manipulate a pointer on a screen of a general-purpose computer.

It will be further appreciated that the instructions represented by the operations in the above figures are not required to be performed in the order illustrated, and that all the processing represented by the operations may not be necessary to practice the invention. It should also be appreciated that some operations may have sub-operations and in other instances, certain operations described herein may not be included in the illustrated operations. Further, the processes described in any of the above figures can also be implemented in software stored in any one of or combinations of the RAM, the ROM, or the hard disk drive.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Furthermore, each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible, e.g., a NOR memory array. One of skill in the art will recognize that the NAND and NOR memory configurations are exemplary, and memory elements may be otherwise configured.

The semiconductor memory elements of a single device, such as elements located within and/or over the same substrate or in a single die, may be distributed in two or three dimensions, such as a two dimensional array structure or a three dimensional array structure.

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer over which the layers of the memory elements are deposited and/or in which memory elements are formed or it may be a carrier substrate which is attached to the memory elements after they are formed.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, such as bit lines and word lines.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked memory planes. The columns may be arranged in a two dimensional configuration, e.g., in an x-z plane, thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single horizontal (e.g., x-z) plane. Alternatively, the memory elements may be connected together to extend through multiple horizontal planes. Other three dimensional configurations can be envisioned wherein some NAND strings contain memory elements in a single memory level while other strings contain memory elements which extend through multiple memory levels. Three dimensional memory arrays may also be designed in a NOR configuration and in a ReRAM configuration.

A monolithic three dimensional memory array is one in which multiple memory levels are formed above and/or within a single substrate, such as a semiconductor wafer. In a monolithic three dimensional array the layers of each level of the array are formed on the layers of each underlying level of the array. One of skill in the art will understand that layers of adjacent levels of a monolithic three dimensional memory array may be shared or have intervening layers between memory levels. In contrast, two dimensional arrays may be formed separately and then packaged together to form a non-monolithic memory device. For example, non-monolithic stacked memories have been constructed by forming memory levels on separate substrates and adhering the memory levels atop each other. The substrates may be thinned or removed from the memory levels before bonding, but as the memory levels are initially formed over separate substrates, such memories are not monolithic three dimensional memory arrays. Further, multiple two dimensional memory arrays or three dimensional memory arrays (monolithic or non-monolithic) may be formed separately and then packaged together to form a stacked-chip memory device.

One of skill in the art will recognize that this invention is not limited to the two dimensional and three dimensional exemplary structures described but cover all relevant memory structures within the spirit and scope of the invention as described herein and as understood by one of skill in the art.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system, comprising:
   a memory controller configured to execute memory commands on a non-volatile memory, wherein executing a memory command comprises performing one or more processing operations of the memory command by use of a respective one of a plurality of process logic blocks of the memory controller; and
   a command fetching engine configured to fetch memory commands from a queue of a host computing system, wherein the command fetching engine is further configured to:
      fetch a first memory command from the queue of the host computing system,
      identify a process logic block of the memory controller that will not be used to perform a processing operation of one or more processing operations of the first memory command during execution of the first memory command by the memory controller, and
      examine memory commands in the queue to identify a queued memory command for partial execution with the first memory command, wherein the queued memory command is identified in response to determining that the identified process block is configured to perform a particular processing operation of the queued memory command,
   wherein the memory controller is configured to execute the first memory command by performing the one or more processing operations of the first memory command and the particular processing operation of the queued memory command by use of process logic blocks of the memory controller, including the identified process logic block.

2. The system of claim 1, wherein the command fetching engine is configured to fetch the queued memory command from the queue of the host computing system as a second memory command,
   wherein the memory controller is configured to execute the second memory command after execution of the first memory command using the particular processing operation performed during execution of the first memory command during execution of the second memory command.

3. The system of claim 1, wherein the particular processing operation comprises an address translation operation, and wherein the memory controller is configured to use the address translation operation performed during execution of the first memory command to execute the second memory command.

4. The system of claim 1, wherein the command fetching engine is configured to search memory command fields of memory commands in the queue of the host computing system to identify the queued memory command for partial execution with the first memory command, wherein the queued memory command is identified in response to determining that the queued memory command comprises a memory command field that corresponds to the identified process block.

5. The system of claim 1, wherein the command fetching engine is configured to partially fetch the queued memory command from the queue via a bus of the host computing system in response to determining that the identified process block is configured to perform the particular processing operation of the queued memory command.

6. The system of claim 5, wherein the fetched portion of the queued memory command comprises a field of the queued memory command that pertains to the particular processing operation and excludes a field of the queued memory command that pertains to a processing operation of the queued memory command other than the particular processing operation.

7. The system of claim 6, wherein the command fetching engine is configured to store the fetched portion of the queued memory command in a command buffer with a pointer identifying the queued memory command in the queue of the host computing system.

8. The system of claim 1, wherein the identified process logic block comprises a translation engine configured to determine logical-to-physical address translations, and wherein performing the particular processing operation of the queued memory command during execution of the first memory command comprises determining a logical-to-physical address translation for the queued memory command, and
   wherein the memory controller is configured to use the determined logical-to-physical address translation to execute the queued memory command.

9. The system of claim 1, wherein each of the plurality of process logic blocks includes one or more of hardware, firmware, and software implemented logic.

10. A non-volatile memory system, comprising:
    a memory device including:
       a memory command buffer configured to store one or more memory commands;
       a plurality of non-volatile memory cells;
       a plurality of process logic blocks configured to execute memory commands stored in the memory command buffer, wherein executing a memory command comprises performing one or more internal operations of the memory command, each internal operation being performed by a respective one of the plurality of process logic blocks,
       a command fetching engine, comprising:
          logic for fetching memory commands from a host command queue;
          logic for storing the memory commands fetched from the host command queue in the memory command buffer;
          logic for identifying idle process logic blocks of memory commands stored in the memory command buffer, wherein identifying an idle process logic block of a first memory command stored in the memory command buffer comprises identifying a process logic block that will not be used to perform an internal operation during execution of the first memory command;
          logic for examining command fields of memory commands held within the host command buffer to identify a second memory command that comprises one or more command fields that correspond to an internal operation performed by the idle process logic block of the first memory command;
          logic for partially fetching a portion of the second memory command from the host command queue, the portion is configured to include the one or more command fields of the second memory command that correspond to the internal operation performed by the idle process logic block and to exclude one or more other command fields of the second memory command; and
          logic for storing the one or more command fields of the partially fetched portion of the second memory command in the memory command buffer;

wherein execution of the first memory command comprises one or more of the process logic blocks performing internal operations corresponding to command fields of the first memory command while the idle process logic block of the first memory command performs the internal operation corresponding to the one or more command fields of the partially fetched portion of the second memory command.

11. A method, comprising:

receiving memory commands for execution at a memory device, each memory command comprising one or more of a plurality of memory command fields, each memory command field corresponding to one of a plurality of command processors of the memory device, wherein executing a command at the memory device comprises processing each field of the memory command using a corresponding command processor of the memory device;

examining a first memory command received for execution at the memory device to identify a command processor that does not correspond to a memory command field of the first memory command such that the identified command processor will be idle during execution of the first memory command at the memory device;

selecting a command field of a second memory command for execution with the first memory command in response to determining that the selected command field corresponds to the identified command processor;

fetching the selected memory command field of the second memory command for execution at the memory device with the first memory command;

and executing the first memory command at the memory device, wherein executing the first memory command comprises performing operations of the one or more memory command fields of the first memory command by use of corresponding command processors of the memory device, and performing one or more operations corresponding to the selected memory command field of the second memory command by use of the identified command processor.

12. The method of claim 11, wherein fetching the selected memory command field of the second memory command comprises partially fetching a portion of the second memory command from a queue of a host computing device, the portion including the selected memory command field and excluding one or more other memory command fields of the second memory command.

13. The method of claim 11, wherein fetching the selected memory command field for execution at the memory device comprises fetching the second memory command via a bus, the method further comprising:

executing the second memory command after execution of the first memory command, wherein executing the second memory command comprises using the one or more operations corresponding to the selected memory command field performed during execution of the first memory command.

14. The method of claim 11, wherein selecting the command field of the second memory command comprises searching memory command fields of memory commands residing in a memory command queue.

15. The method of claim 11, wherein the second memory command comprises a plurality of memory command fields, and wherein fetching the selected memory command field comprises fetching a portion of the second memory command from a queue, the portion comprising only the selected memory command field such that one or more other memory command fields of the second memory command are omitted from the portion.

16. The method of claim 11, wherein the one or more operations corresponding to the selected memory command field comprise determining an address translation for the second memory command.

17. The method of claim 16, further comprising executing the second memory command subsequent to executing the first memory command, wherein executing the second memory command comprises using the address translation determined for the second memory command during execution of the first memory command fetching the identified non idle field in the not previously fetched memory command.

18. The method of claim 16, wherein the second memory command comprises a command to read a logical block address, and determining the address translation for the second memory command comprises translating the logical block address to a physical block address of the memory device.

19. The method of claim 11, wherein receiving the memory commands for execution at the memory device comprises:

fetching the memory commands from a non-volatile memory command queue of a host; and storing the fetched memory commands in a command buffer of the memory device;

and wherein fetching the selected memory command field of the second memory command comprises:

fetching the selected memory command field from the non-volatile memory command queue; and storing the selected memory command field in the command buffer.

20. The method of claim 19, further comprising storing the selected memory command field in the command buffer with a reference to the second memory command.

* * * * *